UNITED STATES PATENT OFFICE.

HERMANN HABERLAND, OF ZSCHERNDORF, NEAR BITTERFELD, GERMANY, ASSIGNOR TO THE FIRM OF SALZBERGWERK NEU-STASSFURT UND THEILNEHMER, OF ZSCHERNDORF, NEAR BITTERFELD, GERMANY.

PROCESS OF MAKING HIGH-PERCENTAGE CRYSTALLIZED POTASSIUM HYDRATE.

1,050,453. Specification of Letters Patent. Patented Jan. 14, 1913.

No Drawing. Application filed May 6, 1907. Serial No. 372,235.

*To all whom it may concern:*

Be it known that I, HERMANN HABERLAND, a subject of the King of Prussia, residing at Zscherndorf, near Bitterfeld, Prussia, Germany, have invented certain new and useful Improvements in Processes of Making High-Percentage Crystallized Potassium Hydrate; and I do hereby declare the following to be a full, clear, and exact description of the invention, such as will enable others skilled in the art to which it appertains to make and use the same.

Potassium hydrate has heretofore been used in trade either as a solution or lye containing about 50% of potassium hydrate or in the form of the solid caustic hydrate melted and molded into blocks or sticks, etc. A crystallized potassium hydrate is not on the market. I, after many careful experiments, have succeeded in producing crystallized caustic potash containing a high percentage of KOH of uniform composition and free from impurities, especially chlorids and sodium combinations.

There are several forms of potassium hydrate known; one containing four molecules of water of crystallization $KOH.4H_2O$; one containing two molecules of water of crystallization $KOH.2H_2O$; the best known of these is the one that contains two molecules of water of crystallization which separates in large quantities at low temperature especially in winter, from the concentrated potassium hydrate solution shipped in iron vessels. This hydrate contains 60.9% KOH. The hydrate having four molecules of water of crystallization which separates at temperatures considerably below 0° C., contains 43.8% KOH. This hydrate on account of its instability can not very well be shipped. The caustic alkali containing two molecules of water is also not suitable for shipping as it rapidly absorbs water from the atmosphere and soon dissolves; and at the comparatively low temperature of 35° C. dissolves in its own water of crystallization; it is therefore of no use for practice. The caustic alkali containing one molecule of water of crystallization is, as I have found, much more suitable for commercial purposes, it has a content of 75.7% KOH and changes, when not closed in air tight vessels, by the gradual absorption of moisture from the air, only very slowly to the form having two molecules of water of crystallization. By reason of its comparative stability, it can be packed and shipped even in wooden vessels. Further, it can be readily comminuted and readily weighed and it is also more easily separated from its solutions without carrying with it impurities.

I have found after many careful experiments, a method of producing potassium hydrate containing any one of the several previously mentioned hydrated forms of caustic potash, from a thorough study of highly concentrated caustic alkali solutions of which the following is a result of my investigations.

Caustic potash solutions containing not over 58% of caustic potash when cooled down to 0° C. and also below this temperature, will give only crystals of caustic potash containing two molecules of water of crystallization. From more highly concentrated cooled solutions caustic potash containing one molecule of water is precipitated. When, by this precipitation of caustic potash containing one molecule of water, the concentration of the solution is lowered slightly below 58% KOH, the separation of caustic potash containing two molecules of water begins, besides the separation of caustic potash containing one molecule of water, and a mixed crystallized product is obtained.

Notwithstanding the fact that caustic potash having one molecule of water of crystallization contains only 75.5% KOH, solutions of potash containing more than this percentage when cooled precipitate crystals of caustic potash containing one molecule of water of crystallization until the concentration of the technical lye has risen to the neighborhood of 85% KOH. If there is no impurity as potassium chlorid present or only traces of it present, the solution may be increased in concentration somewhat higher, to above 86% KOH. If the concentration of the solution reaches above the last mentioned percentage, anhydrous caustic potash *i. e.,* caustic potash free from water of crystallization is precipitated; for example, a caustic potash solution containing about 90% KOH and more when cooled will precipitate anhydrous KOH until the solution drops in concentration to about 85% or 86%, when the precipitation of an eutectic mixture of KOH and $KOH.H_2O$ sets in and the solution freezes by further cooling with the above mentioned contents. This eutectic mixture of the anhydrous and monohydrated hydroxid is peculiar to caustic potash. On the other hand monohydrated potassium hydroxid will be precipitated from solutions of caustic potash between a concentration of 75.7% and a concentration of about 85% KOH. At the latter concentration the crystallization of the said eutectic mixture sets in. Therefore in the manufacture of crystallized potassium hydrate according to the present invention the following conditions are to be observed: From solutions containing 58 to 75.7% KOH when cooled precipitates caustic potash having one molecule of water of crystallization and below 58% crystals of caustic potash containing two molecules of water of crystallization separate, but the limits of concentration are not well determined for the latter separation, experiments have shown, however, that the lower limit of concentration is nearer 57% than 58%. From solutions having a content of less than 85% and more than 75.7% KOH, caustic potash crystals containing one molecule of water are separated, until the concentration rises to about 85% when on cooling said eutectic crystallization sets in. If a solution is concentrated above 85%, anhydrous KOH is precipitated until concentration of the solution drops again to 85%, whereafter the said eutectic crystallization sets in. The separation of crystals from their solution can readily be done *e. g.* by centrifugalization, and it will thus be possible to separate from the solution any of the desired precipitates, so that from solutions from 85 to 90% anhydrous potassium hydrate may be obtained which heretofore has been a very difficult matter and this substance up to the present is not on the market. It is also possible to obtain caustic alkali containing one molecule of water of crystallization and separate it from its solution and dry it, the small quantity of solution that remains sticking to the crystals stiffens immediately and both the anhydrous caustic potash and the caustic potash containing one molecule of water of crystallization are comparatively stable since they only gradually pass over by the absorption of moisture from the atmosphere into those forms containing a greater number of molecules of water of crystallization. These products being of a uniform quality are readily subdivided and when necessary easily mixed with other bodies, thereby lending themselves admirably to chemical reactions. The melted caustic potash of commerce is not uniform throughout. In the commercial practice, pure caustic potash solutions have not been used up to the present as the commercial caustic potash contains a greater or less quantity of potassium chlorid and a more or less quantity of sodium salts. By crystallizing out the caustic potash of the forms I have described, chlorin and sodium salts are continually eliminated and for special purposes by interrupting the described crystallization of the caustic potash before a crystallization of the impurities (such as chlorids or sodium salts) takes place and by mechanically freeing the thus obtained crystals from the mother lye adhering thereto, it is possible to obtain substantially chemically pure caustic potash, while the remaining solution may be used as the ordinary melted commercial stick caustic potash or sold as commercial solutions. If it is desirable to obtain caustic potash having a content of less than 75.7% KOH, it is only necessary to allow the concentration of the solution to go below 58% KOH without separating the crystals having the composition $KOH.H_2O$, and to separate the mother lye as soon as the crystals possess the desired composition.

By combination of the above steps it is possible to obtain caustic potash having a content of potassium hydrate (KOH) ranging from 61% to about 100% in any desired degree of purity free from chlorids, sodium salts and other impurities.

It may be stated that the crystallized anhydrous potassium hydrate forms very small crystals so as to represent a crystal-powder; the crystallized potassium hydroxid with one molecule of water of crystallization ($KOH+H_2O$) forms needles, which are relatively small, if the same had formed from a solution of a relatively high concentration of course within the described limits of the admissible or adapted concentration.

The well known potassium hydrate having having two molecules of water of crystallization forms quite large, transparent, rhombic crystals, that upon absorption of moisture from the air become fluid; the crystals melt at about 35° C., and when dissolved in water produce cold.

The new products, produced by the present invention, are white, they melt at temperatures above 100° C. and when placed in water heat it, and when they absorb water from the atmosphere are converted into other forms of potassium hydrate containing more water.

The anhydrous potassium hydrate forms quite opaque small crystals and melts at about 350° C. produces heat upon solution and is converted into potassium hydrate having one molecule of water of crystallization by absorbing moisture from the atmosphere. The potassium hydrate having but one molecule of water of crystallization forms long, white translucent needles that melt at about 140° C., produce heat upon dissolving in water, and are converted by the absorption of moisture from the air into the well known form containing two molecules of water of crystallization

I claim:—

1. The method of obtaining crystals of caustic potash free from impurities, which comprises forming a concentrated solution of caustic potash, cooling the same to form crystals of caustic potash and removing the crystals from the solution before the degree of concentration reaches the point where crystals containing a different amount of water commence to form, and before a crystallization of the impurities takes place.

2. Process for making crystallized anhydrous potassium hydrate, which comprises cooling a solution containing over 86% KOH to obtain crystals containing 100% caustic potash, and removing these crystals before the solution has dropped to about 86% in concentration.

3. A new technical and commercial product, crystallized potassium hydrate containing less than one molecule of water of crystallization forming white crystals having a melting point above 100° C. and producing heat upon being dissolved in water.

4. A new technical and commercial product, anhydrous potassium hydrate forming small, white, opaque crystals having a melting point about 350° C., and deliquescing very slowly and producing heat on solution in water.

In testimony that I claim the foregoing as my invention, I have signed my name in presence of two subscribing witnesses.

HERMANN HABERLAND.

Witnesses:
 JOHANNES HEIN,
 WOLDEMAR HAUPT.